Dec. 8, 1953    W. H. WOOD, JR    2,661,641
MAGNETIC DRILLING AND TAPPING ALIGNMENT JIG
Filed Oct. 23, 1952

Inventor
William H. Wood Jr.
By
Worster & Davis
Attorneys

Patented Dec. 8, 1953

2,661,641

UNITED STATES PATENT OFFICE 2,661,641

MAGNETIC DRILLING AND TAPPING ALIGNMENT JIG

William H. Wood, Jr., Seymour, Conn.

Application October 23, 1952, Serial No. 316,407

5 Claims. (Cl. 77—62)

1

This invention relates to a magnetic drilling and tapping alignment jig, and has for an object to provide a simple and effective jig for positioning and guiding a drill, tap or similar tool when in use, and one which is effectively and positively held in proper position on the work piece to be drilled or tapped, by a strong magnet, thus eliminating the use of bolts and clamps which have to be manipulated and set up for the working operation.

Another object is to provide such a device in which the magnet is mounted for most effective holding of the device on the work piece, and the guiding and positioning means for the tool is so arranged and positioned that a clear view of the point of operation is permitted.

Another object is to provide a device of this character which is of very simple and rigid construction and may be manufactured at low cost.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 1:
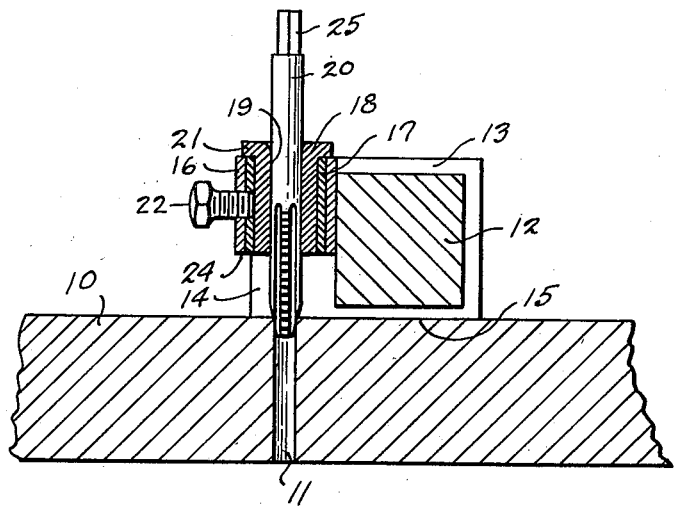
Fig. 1 is a vertical section through the device and a work piece with which it is being used.
Figure 2:
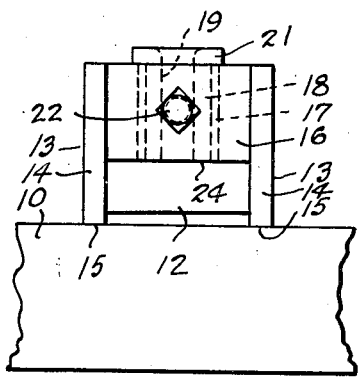
Fig. 2 is a front elevation.
Figure 3:
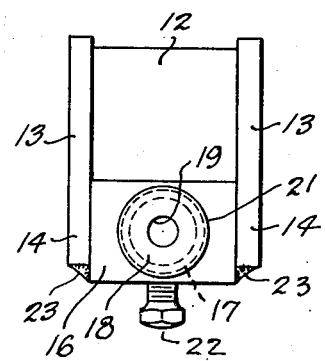
Fig. 3 is a top plan view.

The device is to hold and guide a drill, tap or similar tool absolutely vertical and straight with respect to the work, and in the case of a tap in absolute alignment with the drilled hole during the tapping operation. It is particularly effective for tapping a hole in a relatively thin metal member. In tapping such work it is hard to keep the tap straight and so it will cut the thread properly, as the tap tends to tip laterally out of alignment. With this device the tap is always held straight and in alignment with the hole being threaded, regardless of the thickness of the plate or member being operated upon.

In the drawings, a piece of work is shown at 10, of magnetic material such as iron or steel, provided with a drilled hole 11 to be tapped. It is, however, to be understood the device is equally adapted for holding, positioning and guiding the drill for drilling this hole. The device comprises a magnet 12, which may be either a permanent magnet or an electromagnet, mounted between the two sides or end members 13, which, as shown, are preferably metal end plates of suitable thickness forming pole pieces for the magnet. They are secured to the ends of the magnet by any suitable means, such, for example, as soldering or welding, and they extend forwardly from the magnet forming laterally spaced upright extensions 14. The lower edges 15 of these end members are straight, to rest on the surface of the work piece or member 10 being operated upon, to form close contact between the end members and this work piece for best magnetic attraction and effect, and to also properly position the device on the work piece. These lower edges are spaced below the magnet 12 so as to hold the body of the magnet spaced from the work piece.

Mounted between the extensions 14 is a non-magnetic block or body 16 of any suitable material, but preferably of brass, aluminum, or aluminum or copper alloy, and this block carries a positioning and guiding means for a drill, tap or similar tool to be used. In the present case there is mounted in this block a liner bushing 17, preferably with a press fit in the body, and in this bushing is a slip renewable bushing 18 of hardened steel provided with a guide opening or passage 19 for the tool being used, in this case the tap 20. The bushing 18 is detachably mounted in the block and sleeve so that it may be readily removed and changed for guide passages 19 of different diameters for different size tools. It may be supported by an enlarged flange 21 at its upper edge seated on top of the block or bushing, or it may be secured by a suitable set screw 22, or both. The block 16 is mounted between the extensions 14 by any suitable means, such, for example, as soldering 23. The opening 19 in the guide bushing 18 corresponds in size with the size of the drill or tap being used, so as to form a guide for this drill or tap to position it and hold it accurately in the vertical position. The lower end or surface 24 of the block 16 and the lower ends of the bushings are spaced above the lower edges 15 of the supporting and holding end members 13 so as to space it from the surface of the work and give a clear view of the opening or point on the work piece at which the drilling or tapping operations are being performed.

In use the device is placed on top of the work member or piece 10, and if it is to be used for guiding a drill, is properly positioned with the guide opening 19 in proper alignment with the point to be drilled. If it is to be used for guiding and positioning a tap for an opening already drilled the guide passage 19 is lined up with the drilled hole 11 either by sighting it or by a rod or pin of the size of the opening, and in either case it will be held firmly and positively in this position by attraction of the magnet on the work 10, the end members or plates 13 forming the poles of the magnet and resting on and in close contact with the surface of the work to give maximum holding effect, completing the magnetic circuit through the magnet and the work member. Then the tap is inserted in the guide 19 in the bushing and operated by any suitable means, such, for example, as a hand crank or other driving means on the square end 25.

Thus the jig is automatically and firmly held in proper position by the magnet with the guide bushing over the hole to be drilled, or if the hole is already drilled, over the drilled hole for the tapping operation, and the drill or tap is held in the absolute vertical position, and in the case of a tap in alignment with the drilled opening, during the tapping operation, with no danger of its tipping to one side or going into the opening tilted or slanted, even though the work piece is a relatively thin metal member, thus insuring a straight tapping operation. Also, where the device is used for both the drilling and tapping operation it may be properly positioned for the drilling operation, and then without changing its position the drill may be removed and a tap inserted for the tapping operation in the hole drilled while the jig is in this position, thus assuring absolutely correct positioning and alignment of the tap with the drilled hole, without requiring positioning or setting of any clamps or other holding means. The guide bushing 18 is easily removed and changed for different size drills or taps.

Having thus set forth the nature of my invention, I claim:

1. A jig of the character described comprising a magnet, upright end members secured to the opposite ends of the magnet forming pole pieces for the magnet and provided with straight lower edges to rest on a work member, said end members extending forwardly from the magnet, a nonmagnetic block mounted between said extensions, and an upright guide bushing mounted in the block and provided with a guide passage for a drill or tap.

2. A jig of the character described comprising a magnet, upright metal end members secured to the opposite ends of and forming pole pieces for the magnet, said end members being provided with straight lower edges spaced below the magnet to rest and support the device on a work piece, said end members also including extensions projecting forwardly from the magnet, a nonmagnetic block mounted between the extensions, and a guiding and positioning means for a drill or tap carried by said block.

3. A jig of the character described comprising a magnet, upright metal end members secured to the opposite ends of and forming pole pieces for the magnet, said end members being provided with straight lower edges spaced below the magnet to rest and support the device on a work piece, said end members including laterally spaced extensions extending forwardly from the magnet, a nonmagnetic block mounted between the extensions and spaced at its lower side above the lower edges of the end members to provide a clear view of a work piece under said block on which the jig is located, and an upright guiding and positioning means for a drill or tap carried by said block.

4. A jig of the character described comprising a magnet, upright metal end members secured to the opposite ends of and forming pole pieces for the magnet, said end members being provided with straight lower edges to rest on and support the jig on the surface of a work piece, said end members including laterally spaced extensions extending forwardly from the magnet, a non-magnetic block mounted between the extensions and spaced at its lower side above the lower edges of the end members to provide a clear view of the surface of a work piece under said block on which the jig is located, and an upright bushing removably mounted in the block and provided with an upright guiding and positioning passage for a drill or tap.

5. A jig of the character described comprising a magnet, upright end members comprising relatively thick metal plates secured to the ends of the magnet and forming pole pieces for this magnet, said end members being provided with straight lower edges below the magnet to rest on and support the jig on the surface of a work piece, said end members including extensions projecting forwardly from the magnet, a nonmagnetic block mounted between the extensions and spaced at its lower side above the lower edges of the end members to provide a clear view of the surface of a work piece under said block on which the jig is located, an upright renewable bushing mounted in the block and provided with a guiding and positioning passage for a drill or tap for working on the work piece, and means for detachably securing the bushing in the block.

WILLIAM H. WOOD, Jr.

References Cited in the file of this patent

UNITED STATES PATENTS

| Number | Name | Date |
|--------|------|------|
| 710,257 | De Leeuw | Sept. 30, 1902 |